UNITED STATES PATENT OFFICE.

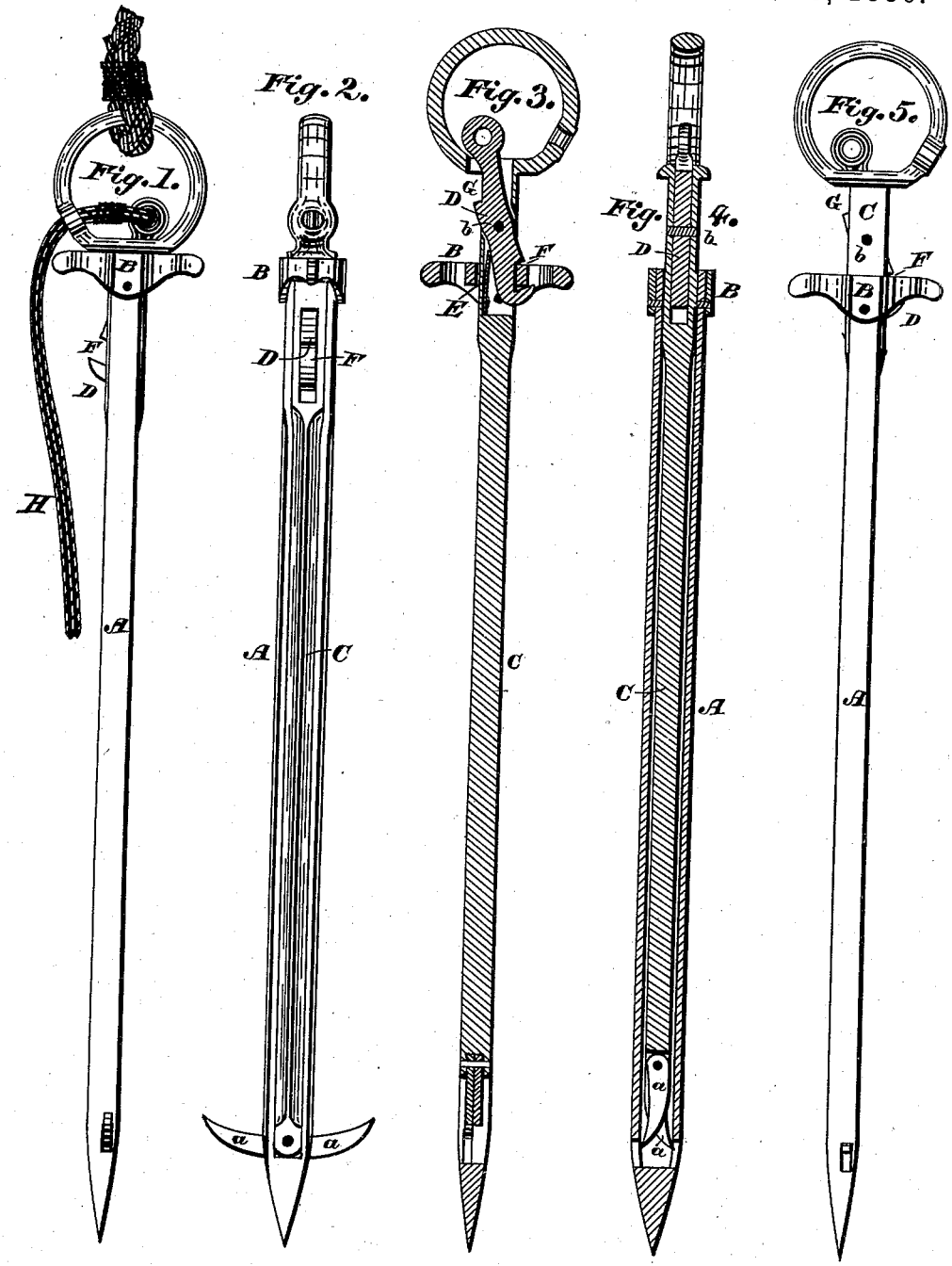

JACOB NEY, OF CANTON, OHIO, ASSIGNOR TO THE NEY MANUFACTURING COMPANY, OF SAME PLACE.

HAY-FORK.

SPECIFICATION forming part of Letters Patent No. 335,036, dated January 26, 1886.

Application filed August 21, 1885. Serial No. 175,015. (No model.)

*To all whom it may concern:*

Be it known that I, JACOB NEY, a citizen of the United States, residing at Canton, in the county of Stark and State of Ohio, have invented certain new and useful Improvements in Hay-Forks; and I do hereby declare that the following is a full, clear, and exact description of the same, reference being had to the annexed drawings, making a part of this specification, and to the letters and figures of reference marked thereon, in which—

Figure 1 is a side elevation. Fig. 2 is a side elevation showing the fork turned one-quarter around from the position shown in Fig. 1. Fig. 3 is a longitudinal section showing the fork in proper position for entering a body of hay or like material. Fig. 4 is a longitudinal section of Fig. 2, showing fork in proper position for entering a body of hay. Fig. 5 is a side elevation showing the fork in position for entering a body of hay or like material.

The present invention has relation to hay-forks designed and calculated to be used in elevating hay and like materials; and its nature consists in the different parts and combination of parts hereinafter described, and particularly pointed out in the claim.

In the accompanying drawings, A represents the body of the fork, which is substantially of the form shown in the drawings, and, as shown, is provided at its bottom or lower end with a sharp point, so as to easily enter a body of hay.

To the top or upper end of the body A is securely attached the bar or frame B, which is substantially of the form shown in the drawings, and is for the purpose hereinafter described.

Within the body A is located the sliding bar C, to the bottom or lower end of which are attached in the ordinary manner the lifting fingers or tines *a*, said tines *a* being so arranged that they will assume the positions shown in Fig. 2 when said sliding bar is forced downward.

The upper part of the sliding bar C is provided with the lock-bar D, which is substantially of the form shown in Fig. 3, and is securely held in proper position by means of the rivet or bolt *b*, the ends of said bolt or rivet *b* being countersunk, so as not to interfere with the movements of the sliding bar C.

To the sliding bar C is properly attached the spring E, as shown in Fig. 3.

The lock-bar D is provided with the notch or recess F, which engages the bar or frame B, as shown in Fig. 3, thereby securely locking the sliding bar C in the position shown in said Fig. 3. The lock-bar D is also provided with the shoulder G, which is for the purpose of securely locking the sliding bar in the position shown in Figs. 1 and 2.

It will be seen that by my peculiar arrangement as the trip rope or cord H is drawn the sliding bar C will be unlocked, no difference in which position it may be locked.

In use the sliding bar C is locked in the position shown in Figs. 3, 4, and 5, when the fork proper is forced into a body of hay, and after the fork has fully entered the sliding bar C is unlocked and placed in the position shown in Figs. 1 and 2, and securely locked in that position, and at the same time securely holding the lifting fingers or tines *a* in the position shown in Fig. 2.

When it is desired to unload the fork after it has arrived at the place of deposit, the trip rope or cord is drawn, thereby disengaging the shoulder G from the bar or frame B and permitting the body A to slide downward, and at the same time bringing the lifting fingers in the position shown in Fig. 4, and locking the different parts in the position shown by means of the notch or recess F, the bar B, and the spring E.

Having now fully described my invention, what I claim as new, and desire to secure by Letters Patent, is—

The body A, provided with the frame or bar B, in combination with the sliding bar C, provided with the locking-bar D, said locking-bar D being provided with the notch or recess F and the shoulder G, and the spring E, substantially as and for the purpose specified.

In testimony that I claim the above I have hereunto subscribed my name in the presence of two witnesses.

JACOB NEY.

Witnesses:
 HARRY FREASE,
 FRED W. BOND.